United States Patent
Dixit et al.

(10) Patent No.: US 9,405,900 B2
(45) Date of Patent: Aug. 2, 2016

(54) INTELLIGENT CYBERPHYSICAL INTRUSION DETECTION AND PREVENTION SYSTEMS AND METHODS FOR INDUSTRIAL CONTROL SYSTEMS

(71) Applicant: General Electric Company, Schenectady, NY (US)

(72) Inventors: Paritosh Dixit, Hyderabad (IN); Daniel Thanos, Markham (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/801,496

(22) Filed: Mar. 13, 2013

(65) Prior Publication Data
US 2014/0283047 A1      Sep. 18, 2014

(51) Int. Cl.
G06F 21/55     (2013.01)
H04L 29/06     (2006.01)

(52) U.S. Cl.
CPC ............ G06F 21/55 (2013.01); H04L 63/1425 (2013.01); *Y02B 70/346* (2013.01); *Y04S 20/525* (2013.01)

(58) Field of Classification Search
None
See application file for complete search history.

(56) References Cited

U.S. PATENT DOCUMENTS

| 6,980,927 | B2 | 12/2005 | Tracy et al. |
| 7,954,160 | B2 | 5/2011 | Strauss et al. |
| 7,966,659 | B1 * | 6/2011 | Wilkinson .......... H04L 63/0209 726/11 |
| 8,656,492 | B2 | 2/2014 | Boot et al. |
| 2009/0217385 | A1 | 8/2009 | Teow et al. |
| 2010/0058072 | A1 | 3/2010 | Teow et al. |
| 2011/0208849 | A1 | 8/2011 | Barnett et al. |
| 2011/0288692 | A1 * | 11/2011 | Scott .............................. 700/297 |
| 2012/0106406 | A1 * | 5/2012 | Xu ......................... H04L 47/624 370/280 |
| 2012/0304007 | A1 | 11/2012 | Hanks et al. |
| 2013/0086635 | A1 | 4/2013 | Hershey et al. |
| 2013/0086680 | A1 | 4/2013 | Hershey et al. |

FOREIGN PATENT DOCUMENTS

EP              645644  A1      3/1995

OTHER PUBLICATIONS

Knapp, "Chapter 7: Establishing Secure Enclaves; Chapter 8: Exception, Anomaly, and Threat Detection; Chapter 9: Monitoring Enclaves", Industrial Network Security. Securing critical infrastructure networks for smart grid, SCADA, and other indurstial control systems, pp. 147-247, Aug. 31, 2011.

European Search Report and Opinion issued in connection with corresponding EP Application No. 14158644.6 on Jun. 24, 2014.

\* cited by examiner

*Primary Examiner* — Saleh Najjar
*Assistant Examiner* — Shu Chun Gao
(74) *Attorney, Agent, or Firm* — Cynthia R. Parks; Parks IP Law LLC

(57) ABSTRACT

The embodiments described herein include a system and a method. In one embodiment, a system includes a device monitoring component configured to measure control system behavior and an intrusion prevention system communicatively coupled to the device monitoring component and a communications network. The intrusion prevention system includes a control system analysis component configured to analyze the control system behavior measured by the device monitoring component against a first rule set to determine whether an anomaly, an intrusion, or both are present.

20 Claims, 4 Drawing Sheets

INTELLIGENT CYBERPHYSICAL INTRUSION DETECTION AND PREVENTION SYSTEMS AND METHODS FOR INDUSTRIAL CONTROL SYSTEMS

BACKGROUND

This disclosure related to an intrusion prevention system (IPS) that detects security breaches in a control system by monitoring the physical behavior of the control system.

Generally, an IPS may be configured to detect and/or prevent a digital intrusion into the control system, such as the industrial control system, by monitoring network communications in the control system. Specifically, the network IPS may look for indications of an intrusion and/or anomaly based on network parameters. For example, the network IPS may monitor parameters such as network traffic, file system access/modifications, or operating system/library calls. The monitored parameters may then be compared to rule sets to determine whether intrusions and/or anomalies are present in the control system.

Security breaches, referred to as intrusions, may enable an unauthorized party to access a control system, such as an industrial control system, and cause unexpected behavior within the system. For example, the intrusion may cause the system to perform processes that were not requested. Because the industrial control system may include devices such as turbines, generators, compressors, or combustors, it would be beneficial to improve the security in industrial control systems beyond network parameters.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a system including a device monitoring component configured to measure control system behavior and an intrusion prevention system communicatively coupled to the device monitoring component and a communications network. The intrusion prevention system includes a control system analysis component configured to analyze the control system behavior measured by the device monitoring component against a first rule set to determine whether an anomaly, an intrusion, or both are present.

A second embodiment provides a tangible, non-transitory, computer-readable medium storing a plurality of instructions executable by a processor of an electronic device. The instructions include instructions to receive communication packets, instructions to perform a first test, in which the communication packets are tested against a network rule set, instructions to receive control system measurements, in which the control system measurements are representative of control system behavior, instructions to perform a second test, in which the control system measurements are tested against a control system rule, instructions to correlate results from the first test and the second test, and instructions to determine whether an anomaly, an intrusion, or both are present in the industrial control system based on the correlated results.

A third embodiment provides a system including an intrusion prevention system communicatively coupled to a controller and a supervisory station. The intrusion prevention system is configured to receive network communications sent between the supervisory station and the controller, and to determine whether an anomaly, an intrusion, or both are present based at least in part on a state of the controller, a state of the industrial control system, devices connected to the controller, or any combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
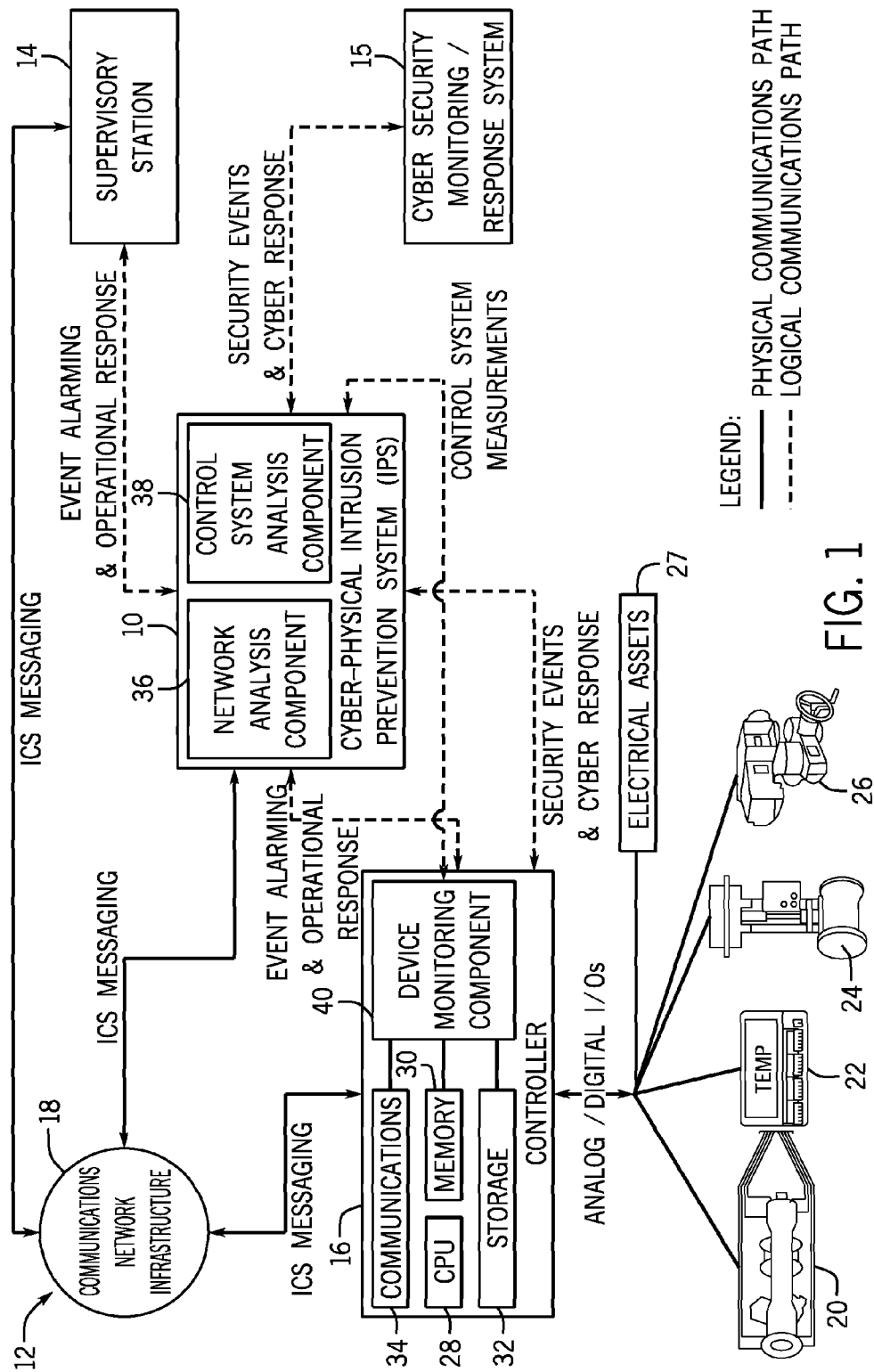
FIG. 1 is a block diagram of an intrusion prevention system (IPS) within an industrial control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards an intrusion prevention system (IPS) disposed in a control system, such as an industrial control system, that may be configured to reduce the possibility of an intrusion entering the industrial control system. As used herein, intrusions refer to digital security breaches that may enter the industrial control system. When intrusions enter the industrial control system, they may cause anomalies within the industrial control system. In other words, intrusions may cause unexpected behavior within the industrial control system. For example, an intrusion may cause the industrial control system to transmit data through network connects that was not requested. Thus, systems designed to reduce intrusions may be configured to monitor network connections in the industrial control system, such as network traffic, file system access/modifications, or operating system/library calls. However, additional parameters in the industrial control system may be monitored in order to improve the security of the industrial control system.

Accordingly, the present disclosure provides a system including a device monitoring component configured to measure control system behavior and an intrusion prevention system communicatively coupled to the device monitoring component and a communications network. The intrusion prevention system includes a control system analysis component configured to analyze the control system behavior measured by the device monitoring component against a rule set to determine whether an anomaly has occurred. In other words, in addition to monitoring network parameters, the disclosed techniques also monitor physical parameters to better understand the industrial control system and better determine whether an anomaly and/or an intrusion is present in the industrial control system.

By way of introduction, FIG. 1 illustrates an embodiment of an intrusion prevention system (IPS) 10 within an industrial control system 12. The industrial control system 12, such as an automated power generation system (e.g., gas, steam, wind, or water turbines, heat recovery steam generators (HRSG), gasification systems, combustion systems, electrical power generators, power grid automation system or similar automated power generation systems) or an automated manufacturing system (e.g., chemical plants, oil refineries, or similar manufacturing system), may include a supervisory station 14, a cyber security monitoring/response system 15, a controller 16, devices, and a communications network 18.

The supervisory station 14 and the controller 16 may be configured to send communication packets through the communications network 18. Specifically, the communication packets may include control commands and/or data. Various protocols may be used by the communications network 18, such as Modbus remote terminal unit (RTU), Profibus, Conitel, International Electrotechnical Commission (IEC) 60870-5-101, IEC 60870-5-104, IEC 61850, Distributed Network Protocol (DNP) 3, or the like. Some of the protocols may include Transmission Control Protocol and Internet Protocol (TCP/IP) extensions, which may enable the industrial control system to be accessible over the internet. Accordingly, one point of entry for an intrusion into the industrial control system 12 may be in the communications network 18.

In addition, the controller 16 may be configured to control various devices, such as turbines 20, sensors 22, actuator 24, and pumps 26. Furthermore, in a substation configuration, the controller 16 may be an intelligent electronic device configured to provide protection, control, and metering functions for power equipment, such as transformers, breakers, switches, motors, or generators. Accordingly, the controller 16 may include a processing unit 28, memory 30, a storage device 32, and a communications apparatus 34 configured to communicate with the devices. Thus, another entry point for an intrusion may be directly into the devices. Other entry points for an intrusion may be directly into the controller 16 or the supervisory station 14.

The depicted industrial control system 12 also includes the IPS 10. The IPS 10 may be a implemented in a computing device (e.g., computer, server, laptop, tablet, cell phone, mobile device, or similar processing or computing device) or in executable non-transitory computer instructions or code stored in a machine readable medium, such as the memory 30 of the controller 16, the supervisory station 14, the storage device 32 of the controller 16, or a combination thereof. In addition to monitoring network parameters, the IPS 10 may be configured to monitor control system (i.e., physical) parameters to determine whether an anomaly and/or an intrusion are present. The IPS 10 may be configured to monitor control system parameters, such as communication with devices, heat generation, or power usage, because they may be an accurate representation of the processes occurring within the industrial control system 12. In other words, the control system parameters are generally based on the laws of physics which may be more difficult to circumvent. For example, because the temperature of a processor may be related to the processes the processor is performing, monitoring the temperature enables the IPS 10 to know if the processor is performing additional processes, such as those caused by an intrusion. Accordingly, the IPS includes a network analysis component 36 and a control system analysis component 38.

The network analysis component 36 may be configured to analyze network parameters of communication packets sent over the communications network 30, such as such as network traffic, file system access/modifications, or operating system/library calls, to determine whether an anomaly and/or an intrusion is present. Accordingly, the network analysis component 38 may be coupled to the communications network 18 and configured to receive the communication packets sent through the communications network 18.

Similarly, the control system analysis component 38 may be configured to analyze control system parameters, such as communication with devices, heat generation, or power usage, to determine whether an anomaly and/or intrusion has occurred. Thus, the IPS 10 may further include a device monitoring component 40 configured to monitor measure control system (i.e., physical) parameters of the controller 16 and the devices (e.g., turbine 20, sensor 22, actuator 24, pump 26, or electrical assists 27) controlled by the controller 16. Accordingly, the device monitoring component 40 may be communicatively coupled to the controller 16. In the depicted embodiment, the device monitoring component 40 is located within the controller 16 and directly coupled to the processing unit 28, the memory 30, the storage device 32, and the communications apparatus 34. Alternatively, the device monitoring component 40 may be implemented in a separate computing device or in executable non-transitory computer instructions stored in a machine readable medium, such as the memory 30 of the controller 16, the supervisory station 14, the storage device 32 of the controller 16, or a combination thereof.

As described above, the device monitoring component 40 may be configured to measure control system (i.e., physical) parameters. The measured control system (i.e., physical) parameters are the physical results of the operation of the industrial control system 10. Accordingly, they may provide an indication of the processes taking place in the industrial control system 10. For example, the device monitoring component 40 may measure the power usage or temperature of the processing unit 28, monitor communication activity between the communications apparatus 34 and devices (e.g., turbine 20, sensor 22, actuator 24, pump 26, or electrical assists 27), or measure the timing of processes performed by the controller 16. The measured control system parameters may then be transmitted to the control system analysis component 10 and analyzed against the control system rule set to determine whether an anomaly and/or intrusion is present.

As described above, intrusions into the industrial control system 12 may cause unexpected behavior or anomalies in the industrial control system 12. When an anomaly is detected, the IPS 10 may communicate the anomaly to the supervising station 14 and/or the cyber security monitoring/response system 15 through an alarm. The supervising station 14 and the cyber security monitoring/response system 15 may be configured to act as central systems to correlate the anomalies reported. In addition, both may include human-machine interfaces (HMI) which enable an operator to further examine the anomalies. For example, an operator on the cyber security monitoring/response system 15 may determine that an anomaly is in fact a false positive and change the network rule set accordingly. In addition, the operator may determine a response to the anomaly detected. In other words, the operator may be able to instruct the industrial control system 12 to take actions to ameliorate the anomalies. In some embodiments, the response may be automatically determined and communicated to the industrial control system 12.

Figure 2:
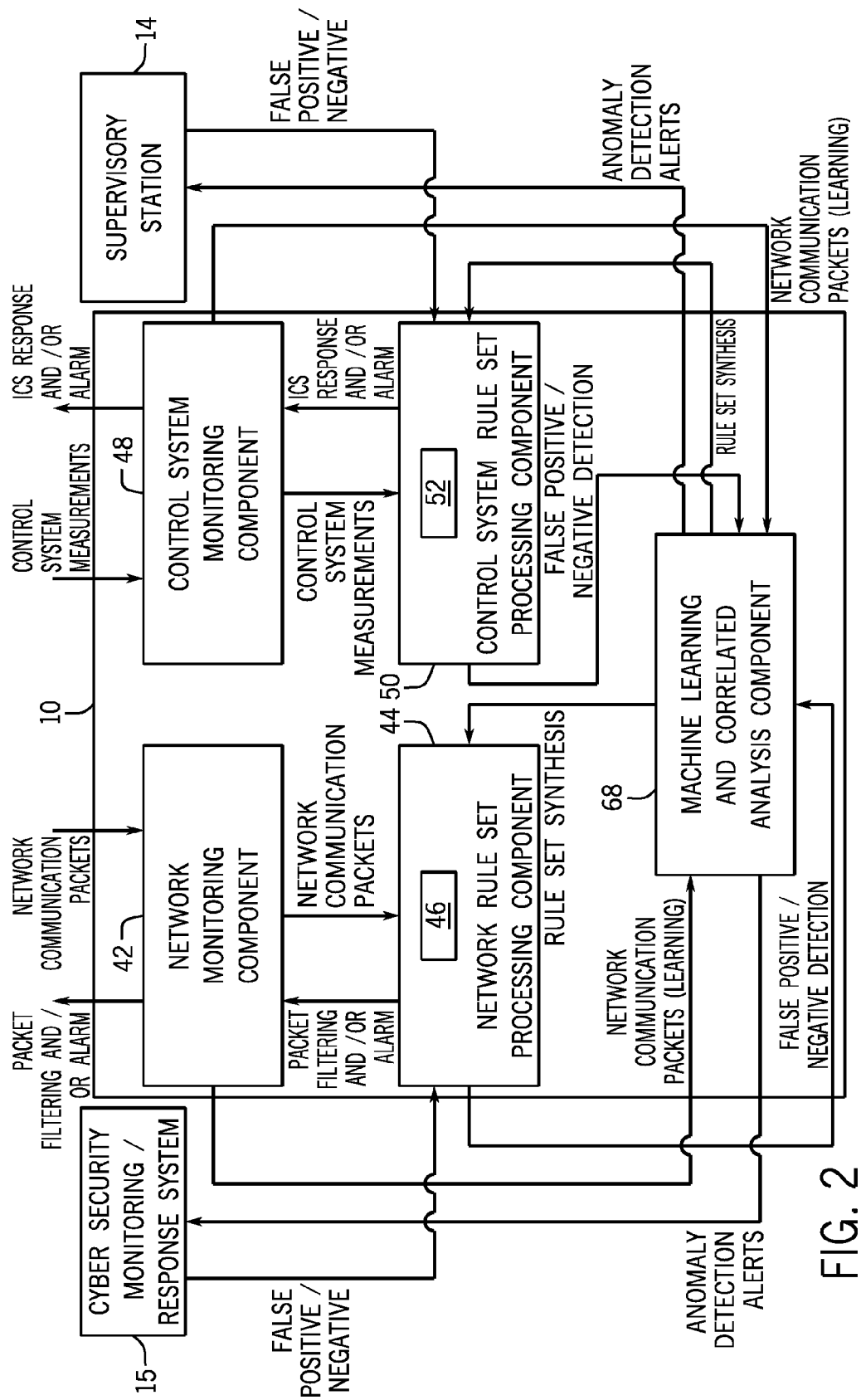
FIG. 2 is a block diagram of an embodiment of the intrusion prevention system (IPS) from FIG. 1.

FIG. 2 illustrates one embodiment of the intrusion prevention system (IPS) 10 shown in FIG. 1. In the depicted embodiment, the network analysis component 36 includes a network monitoring component 42 and a network rule set processing component 44, which includes a network rule set 46. Similarly, the control system analysis component 38 includes a control system monitoring component 48 and a control system rule set processing component 50, which includes a control system rule set 52.

As described above, the IPS 10 is configured to receive communication packets from the communication network 18 and control system measurements from the device monitoring component 40. The communication packets may first enter the IPS 10 through the network monitoring component 42. The network monitoring component 42 may be configured to act as a gateway to the IPS 10. The communication packets are then passed to a network rule set processing component 44. The network rule set processing component 44 may be configured to analyze the communication packets against the network rule set 46 to determine whether a network anomaly and/or intrusion is present. Similarly, the control system measurements first enter the IPS 10 through the control system monitoring component 48 and are then passed to the control system rule set processing component 50. The control system rule set processing component 50 may be configured to analyze the control system measurements against the control system rule set 52 to determine whether a control system anomaly and/or intrusion is present.

Figure 3:
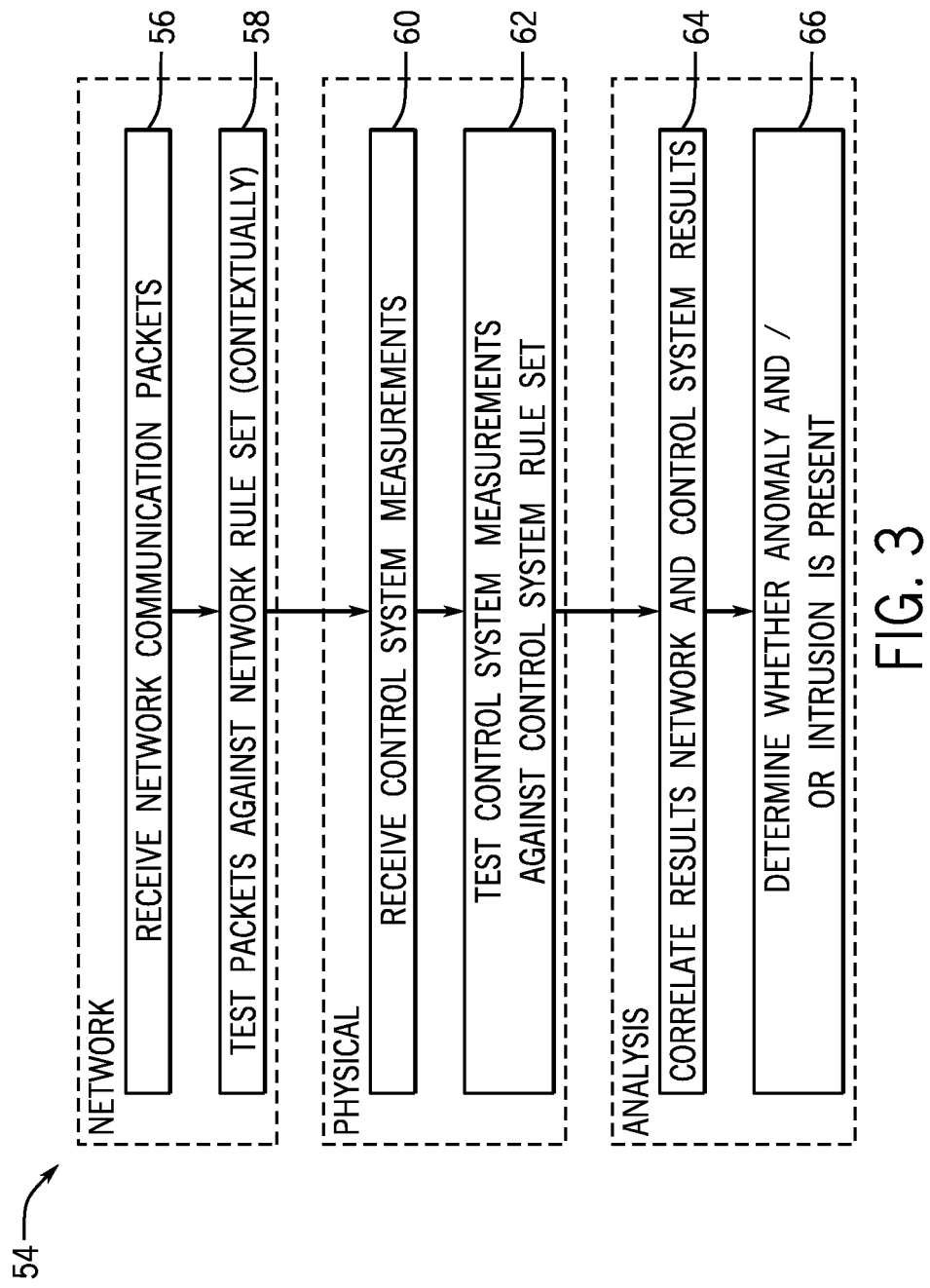
FIG. 3 is a flowchart of an embodiment of a process suitable for determining whether an anomaly has occurred within an industrial control system.

FIG. 3 illustrates one embodiment of a process 54 used by the IPS 10 to determine whether an anomaly and/or an intrusion is present. The process 54 may begin with the network monitoring component 42 receiving communication packets from the communication network 18 (block 56). As described above, the communication packets may include control commands and/or data between the supervisory station 14 and the controller 16. The control commands may include file system access/modification, application/process calls, operating system calls, library calls, or any combination thereof. The data may include measurements taken by devices, such as sensors 22, coupled to the controller 16.

Next, the network rule set processing component 44 may test the received packets against the network rule set 46 (block 58) to determine whether the network rule set processing component 44 believes a network anomaly and/or intrusion is present. The network rule set 46 may be configured to include a white list and a black list. The white list may be a list of communication packets that the IPS 10 believes are not related to an intrusion and the black list may be a list of communication packets that the IPS 10 believes are related to an intrusion. In the instances where the communication packet does not fall within either the white list or the black list, it may be classified as a network anomaly because the IPS 10 may be unsure whether an intrusion is present.

In addition, to better characterize the communication packets, the network rule set processing component 44 may be configured to look at the network communications contextually. In other words, the network rule set processing component 44 may be configured to look at least in part at a state of the controller, a state of the industrial control system, devices connected to the controller, or any combination thereof. For example, when a device (e.g., turbines 20, sensors 22, actuator 24, pumps 26, or electrical assists 27) is in a commissioned state, the device is operational and little changes to the configurations should be made. Accordingly, when the network rule set processing component 44 determines that the communication packet is attempting to change a configuration, such as the electrical protection setting, the communication packet may be identified as a network anomaly. Comparatively, when the device is in a configuration state, more changes to the configurations should be permitted to enable the device to be configured. Other states may include a maintenance state, an emergency state, or a security response state. Similarly, the network rule set processing component 44 may identify a communication packet as a network anomaly if the communication packet is intended for a device, such as the turbine 20, but the turbine 20 is not in the industrial control system 12.

The process 54 may continue with the control system monitoring component 48 receiving the control system measurements from the device monitoring component 40 (block 60). As described above, the device monitoring component 40 may be configured to make control system (i.e., physical) measurements on the industrial control system 12, such as power usage of components in the controller, temperature of the components in the controller, timing of operations, input/output of the controller, telemetry data of devices coupled to the controller, or any combination thereof. For example, the device monitoring component 40 may measure the power usage or temperature of the processing unit 28, monitor communication activity between the communications apparatus 34 and devices (e.g., turbine 20, sensor 22, actuator 24, pump 26, or electrical assists 27), or measure the timing of processes performed by the controller 16. In addition, the device monitoring component 40 may measure telemetry data of the devices, such as the speed the turbine 20 is rotating. It should be appreciated that the measured parameters represent the processes occurring within the industrial control system 12.

Next, the control system rule set processing component 50 may test the received measurements against the control system rule set 52 (block 62) to determine whether the control system rule set processing component 50 believes a control system anomaly and/or an intrusion is present. Again, the control system rule set 52 may be configured to include a white list and a black list. The white list may include appropriate measurement ranges for the measured parameter when control system anomalies are not present. The black list may include threshold values that once met may signify an intrusion. It should be appreciated that when the measurement value does not fall within the white list range or above the black list threshold it may be classified as a control system anomaly.

The results from block 58 and block 62 may then be correlated (block 64) in a machine learning and correlated analysis component 68 in the IPS 10 to determine whether an intrusion and/or an anomaly are present (block 66). As should be appreciated, the rule sets (e.g., 46 and 52) are not perfect and may return false positives or miss anomalies altogether (i.e., false negative). Accordingly, to achieve a more accurate representation of the industrial control system 12, the machine learning and correlated analysis component 68 may correlate the network anomalies, the control system anomalies, and intrusions to determine whether it believes an anomaly or intrusion is present. A more accurate detection of intrusions and/or anomalies of the industrial control system 12 is achieved because using two rule sets (e.g., 46 and 52)

may lower the possibility of false positives and missed anomalies and/or intrusions. Accordingly, instead of a strict following of the rule sets (e.g., 46 and 52) more leeway may be taken when detecting an anomaly and/or an intrusion.

Returning to FIG. 2, when an anomaly is detected, in addition to the response by the supervising station 14 and/or the cyber security monitoring/response system 15, the IPS 10 itself may take further action. The next action taken by the network rule set processing component 44 and the control system rule set processing component 50 may depend on what mode the IPS 10 is in. Specifically, when the IPS 10 is in a passive mode, the IPS 10 is configured to interfere as minimally in the operation of the industrial control system 12 as possible. Accordingly, the network rule set processing component 44 may be configured to send an alarm through the network monitoring component 42 to the cyber security monitoring/response system 15. Similarly, the control system rule set processing component 50 may be configured to send an alarm through the control system monitoring component 48 to the supervisory system 14. When the IPS 10 is in an active mode, the IPS 10 is configured to actively protect the industrial control system 12. Accordingly, the network rule set processing component 44 may be configured to filter communication packets that are anomalies and the control system rule set processing component 50 may be configured to send a control system. For example, if the control system rule set processing component 50 determines that a detected anomaly will cause a device to act unexpectedly, the control system rule set processing component 50 may send a control signal to cease operation of the device.

As described above, the IPS 10 further may include the machine learning and correlated analysis component 68. The machine learning and correlation analysis component 54 may be configured to facilitate creating and modifying the rules sets (e.g., 46 and 52). In the depicted embodiment, the cyber security monitoring/response system 15 and the supervisory station 14 may be configured to communicate false positives and false negatives to the IPS 10. The machine learning and correlated analysis component 68 may be configured to modify the rule sets (e.g., 46 and 52) accordingly. Specifically, in the depicted embodiment, the cyber security monitoring/response system 15 communicates the network false positives and false negatives to the network rule set processing component 44 and the supervisory station 14 communicates the control system false positives and false negatives to the control system rule set processing component 50. The false negatives and false positives are then communicated to the machine learning and correlated analysis component 68.

Figure 4:
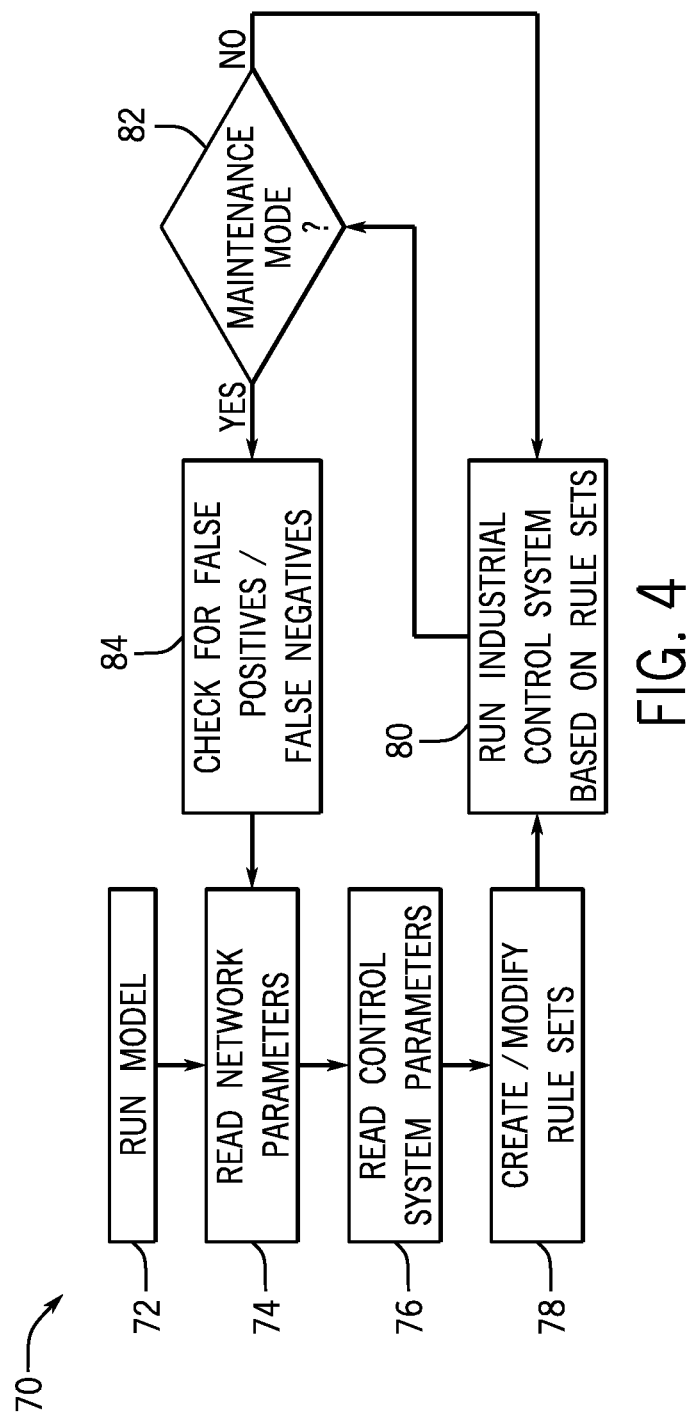
FIG. 4 is a flowchart of an embodiment of a process suitable for creating and/or modifying rule sets in an intrusion prevention system (IPS).

FIG. 4 illustrates one embodiment of a process 70 configured to create and/or maintain the rule sets (e.g., 46 and 52). When the IPS 10 is in a configuration/training mode, the rule sets (e.g., 46 and 52) may be created based on a model. Accordingly, when the IPS 10 is in a configuration/training mode, the process 70 may begin by running a model (block 72). The model may be a known set of operations with no intrusions present. Next, the IPS 10 reads the network parameters (block 74). As described above, the network parameters may include the communication packets communicated between the controller 16 and the supervisory station 14. Similarly, the IPS 10 reads the control system parameters (block 76). As described above, the control system parameters may include measurements from the device monitoring component 40, such as power usage, temperature, timing, or device (e.g., 20, 22, 24, 26, or 27) telemetry. The read network parameters and control systems parameters may then be used to create the rule sets (e.g., 46 and 52) (block 78) because they represent the expected parameters with no intrusions and/or anomalies present. Once the rule sets (e.g., 46 and 52) are created, the IPS 10 may monitor the operation of the industrial control system 12 and determine whether anomalies and/or intrusions are present based on the rule sets (e.g., 46 and 52).

As described above, the rule sets (e.g., 46 and 52) may not be perfect. Accordingly, the rule sets (e.g., 46 and 52) may then be maintained/modified to better detect anomalies and/or intrusions. The rule sets (e.g., 46 and 52) may be modified when the IPS 10 is in a maintenance mode (decision block 82). When the IPS 10 is in a maintenance mode, the process 70 may check for false positive and/or false negatives from the cyber security monitoring response system 15 and the supervisory station 14. Then, the IPS again reads the network parameters (block 74) and the control system parameters (block 76). Accordingly, the rule sets (e.g., 46 and 52) may be modified based on the false positives, false negatives, read network parameters, and control system parameters. Because the industrial control system 12 may contain some intrusions and/or anomalies the IPS 10 may use algorithm, such as Bayesian classifiers, support vector machines, artificial neural networks, or evolutionary/genetic algorithms.

Technical effects of the disclosed embodiments include improving the security in industrial control system 12. Specifically, the disclosed techniques describe an intrusion prevention system (IPS) 10 configured to better understand the processes occurring in the industrial control system 12. For example, the IPS 10 is configured to monitor both network parameters and control system parameters, such as power usage, temperature, timing, or telemetry data. In addition, the IPS 10 may be configured to monitor the network parameters in the larger context of the industrial control system 12. Finally, the IPS 10 may be configured to create/modify the rule sets (e.g., 46 and 52) based on both the network parameters and the control system parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a device monitoring component configured to measure control system behavior; and
an intrusion prevention system communicatively coupled to the device monitoring component and a communications network, wherein the intrusion prevention system includes:
a control system analysis component configured to analyze the control system behavior measured by the device monitoring component against a first rule set;
a network analysis component configured to analyze network parameters of communication packets transmitted over the communications network against a second rule set by performing a comparison between the network parameters and data included in a first list and in a second list and classifying the communication packets as at least one of an anomaly and an intrusion based on a result of the comparison; and a machine learning and correlated analysis component configured to:
  correlate results from the control system analysis component and the network analysis component;
  determine when the correlated results lead to a false positive or a false negative; and
  modify the first rule set and the second rule set when a false positive or a false negative is detected.

2. The system of claim 1, wherein the first rule set and the second rule set are modified when the intrusion prevention system is in a maintenance mode.

3. The system of claim 1, wherein the control system behavior comprises behavior of a controller when the device monitoring component is communicatively coupled to the controller.

4. The system of claim 3, wherein the controller behavior includes power usage of components in the controller, temperature of the components in the controller, timing of operations, input/output of the controller, telemetry data of devices coupled to the controller, or any combination thereof.

5. The system of claim 4, wherein the component in the controller includes a processing unit, memory, a storage device, and a communication apparatus.

6. The system of claim 3, wherein the device monitoring component is located in the controller.

7. The system of claim 3, wherein the device monitoring component comprises a separate device from the controller.

8. The system of claim 1, wherein the network parameters include network traffic, file system access/modifications, operating system/library calls, or any combination thereof.

9. The system of claim 1, wherein the system is an industrial control system comprising a gas turbine system, a gasification system, a steam turbine system, a wind turbine system, a water turbine system, a power generation system, a power grid automation system, or any combination thereof.

10. A tangible, non-transitory, computer-readable medium storing instructions, that when executed by a processor, cause the processor to perform operations comprising:
  executing a model that simulates operation of an industrial control system, wherein the model does not contain intrusions;
  determining network parameters of communication packets transmitted when executing the model;
  generating a network rule set based at least in part on the network parameters;
  determining control system parameters measured when running the model;
  generating a control system rule set based at least in part on the control system parameters, wherein the control system rule set and the network rule set are configured to be used to detect whether an intrusion is present during operation of the industrial control system;
  performing a comparison between the network parameters and data included in a first list and in a second list; and
  classifying the communication packets as an intrusion based on a result of the comparison.

11. The medium of claim 10, wherein the operations further comprise testing control system measurements against the control system rule set.

12. The medium of claim 10, wherein the communications packets include communication packets sent between a controller and a supervisory station.

13. The medium of claim 10, wherein the industrial control system comprises a gas turbine system, a gasification system, a steam turbine system, a wind turbine system, a water turbine system, a power generation system, a power grid automation system, or any combination thereof.

14. The medium of claim 10, wherein the operations further comprise:
  operating the industrial control system;
  receiving the communication packets from a communication network in the industrial control system;
  receiving control system measurements from one or more sensors in the industrial control system; and
  analyzing the control system measurements against the control system rule set.

15. The medium of claim 10, wherein the operation further comprise:
  operating the industrial control system;
  determining when a false negative or a false positive is detected using the network rule set and the control system rule set; and
  modifying the network rule set and the control system rule set to reduce possibility of future false negatives or false positives.

16. A system comprising:
  an intrusion prevention system communicatively coupled to a controller and a supervisory station in an industrial system, wherein the intrusion prevention system is configured to:
  receive network communications sent between the supervisory station and the controller; and
  analyze network parameters of communication packets associated with the network communications against a rule set to determine whether an anomaly, an intrusion, or both are present based on a comparison between the network parameters and data included in a first list and in a second list and based on at least in part on a state of the controller, a state of the industrial control system, or both;
  wherein possible states of the controller comprise a commissioned or operational state, a maintenance state, a configuration state, an emergency state, and a security response state and possible states of the industrial control system comprise a commissioned or operational state, a maintenance state, a configuration state, an energy state, and security response state.

17. The system of claim 16, wherein, when the controller is in the commission or operational state, the intrusion prevention system is configured to detect an anomaly, an intrusion, or both when the network communications comprise instructions to adjust operation of the controller.

18. The system of claim 16, wherein the intrusion system is configured to determine whether an anomaly, an intrusion, or both are present based at least in part on what devices are connected to the controller.

19. The system of claim 18, wherein the devices connected to the controller includes turbine systems, sensors, pumps, actuators, valves, transformers, breakers, switches, motors, generators, or any combination thereof.

20. The system of claim 16, wherein the system comprises the industrial control system comprising a gas turbine system, a gasification system, a steam turbine system, a wind turbine system, a water turbine system, a power generation system, a power grid automation system, or any combination thereof.

* * * * *